United States Patent
Haseyama et al.

(10) Patent No.: US 7,788,909 B2
(45) Date of Patent: Sep. 7, 2010

(54) EXHAUST GAS PURIFICATION METHOD AND EXHAUST GAS PURIFICATION SYSTEM

(75) Inventors: Takashi Haseyama, Fujisawa (JP); Takao Onodera, Fujisawa (JP); Yoshinobu Watanabe, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 1 day.

(21) Appl. No.: 12/087,467

(22) PCT Filed: Jan. 10, 2007

(86) PCT No.: PCT/JP2007/050148

§ 371 (c)(1),
(2), (4) Date: Jul. 8, 2008

(87) PCT Pub. No.: WO2007/086253

PCT Pub. Date: Aug. 2, 2007

(65) Prior Publication Data

US 2009/0056316 A1 Mar. 5, 2009

(30) Foreign Application Priority Data

Jan. 27, 2006 (JP) .............................. 2006-018632

(51) Int. Cl.
*F01N 3/00* (2006.01)
(52) U.S. Cl. .............................. 60/286; 60/274; 60/295; 60/297; 60/303; 60/311
(58) Field of Classification Search ................... 60/276, 60/286, 295, 297, 303, 311
See application file for complete search history.

(56) References Cited

U.S. PATENT DOCUMENTS 7,533,524 B2 * 5/2009 Wang et al. ................... 60/297
2005/0217253 A1 10/2005 Onodera et al.

FOREIGN PATENT DOCUMENTS

DE 10 2004 045 234 5/2005

(Continued)

OTHER PUBLICATIONS

International Search Report mailed Apr. 17, 2007 in connection with the International application No. PCT/JP2007/050148.

(Continued)

*Primary Examiner*—Thomas E Denion
*Assistant Examiner*—Diem Tran
(74) *Attorney, Agent, or Firm*—Staas & Halsey LLP (57) ABSTRACT

An exhaust gas purification system including an exhaust gas purification device having an oxidation catalyst device including an oxidation catalyst and a diesel particulate filter ("DPF") arranged in order from an upstream side, or a DPF carrying an oxidation catalyst in an exhaust passage of an internal combustion engine. At regeneration of the DPF, when a catalyst temperature index temperature (Tg2), indicating a temperature of the oxidation catalyst, becomes equal to a predetermined determining temperature (Tc1) or above, a temperature of the DPF is raised by supplying an unburned fuel to the upstream side of the oxidation catalyst to thereby oxidize the unburned fuel by the oxidation catalyst. The predetermined determining temperature (Tc1) is changed according to an engine speed Ne of the internal combustion engine. By so oxidizing the unburned fuel supplied into an exhaust gas by the oxidation catalyst, outflow of white smoke is prevented regardless of an operation state of the internal combustion engine.

6 Claims, 4 Drawing Sheets

FOREIGN PATENT DOCUMENTS

| | | |
|---|---|---|
| JP | 2002-89327 | 3/2002 |
| JP | 2003-155915 | 5/2003 |
| JP | 2003-155916 | 5/2003 |
| JP | 2003-155917 | 5/2003 |
| JP | 2005-090434 | 4/2005 |
| JP | 2005-105821 | 4/2005 |
| JP | 2005-325771 | 11/2005 |

OTHER PUBLICATIONS

Patent Abstracts of Japan, Publication No. 2003-155915, Published May 30, 2003.
Patent Abstracts of Japan, Publication No. 2003-155916, Published May 30, 2003.
Patent Abstracts of Japan, Publication No. 2003-155917, Published May 30, 2003.
Patent Abstracts of Japan, Publication No. 2005-105821, Published Apr. 21, 2005.
Patent Abstracts of Japan, Publication No. 2005-325771, Published Nov. 24, 2005.
Japanese language Office Action in Application No. 2006-018632, mailed Dec. 16, 2008. (3 pages).
Supplementary Search Report dated Nov. 24, 2009 in European application No. 07706495.4.

* cited by examiner

EXHAUST GAS PURIFICATION METHOD AND EXHAUST GAS PURIFICATION SYSTEM

CROSS REFERENCE TO RELATED APPLICATIONS

This application claims the benefit under 35 U.S.C. Section 371, of PCT International Application Number PCT/JP2007/050148, filed Jan. 10, 2007 and Japanese Application No. 2006-018632 filed Jan. 27, 2006 in Japan, the contents of which are incorporated herein by reference.

BACKGROUND OF THE INVENTION

Field of the Invention

The present invention relates to an exhaust gas purification method and an exhaust gas purification system in which an unburned fuel supplied into an exhaust gas by post injection in in-cylinder fuel injection, direct injection in an exhaust pipe, or the like in an internal combustion engine is oxidized by an oxidation catalyst, by and using the resulting oxidation heat, a temperature of a diesel particulate filter is raised for regeneration.

Regulations on the amount of particulate matter "(PM)" exhausted from a diesel engine as well as NOx, CO, HC and the like have been tightened year by year. A technology has been developed that the PM is collected by a filter called a diesel particulate filter ("DPF"): to thereby reduce the PM amount exhausted to the outside. A continuous regeneration type DPF device carrying a catalyst is among them.

In this continuous regeneration type DPF device, when an exhaust gas temperature is approximately 350° C. or above, the PM collected by the filter is continuously burned and purified, and the filter is self-regenerated. However, if the exhaust temperature is low, the temperature of a catalyst is lowered and the catalyst is not activated. Thus, the oxidation reaction is not promoted, and oxidation of the PM and regeneration of the filter become difficult. As a result, accumulation of PM on the fitter clogs the filter, which results in a problem of exhaust pressure rise.

One of the methods to solve such a problem is forced regeneration control for forcedly burning and removing the collected PM by forcedly raising the temperature of exhaust gas when the clogging of the filter exceeds a predetermined amount. Methods of detecting clogging of the filter detecting a differential pressure between upstream and downstream of the filter, acquiring a PM cumulative amount from an engine operation state, and the like.

In this forced regeneration control, exhaust gas temperature rise control is conducted to thereby raise the temperature of the exhausts gas flowing into the filter to a temperature or above at which the PM collected by the filter is burned. This kind of exhaust gas temperature rise control includes methods of conducting multiple injection (multiple-stage delayed injection) or post injection in the cylinder (in-cylinder) fuel injection, a direct injection into an exhaust pipe, and the like.

The multiple injection is a delayed multiple-stage injection in which the fuel is injected into the cylinder in many stages. By this multiple injection, a fuel amount simply burned in the cylinder without generating torque is increased, and the temperature of the exhaust gas exhausted from the cylinder is raised to a catalyst activation temperature or above of the oxidation catalyst. The post injection is injection for auxiliary injection at timing further delayed from the multiple injection after conducting main injection in the in-cylinder injection.

By this post injection, HC (hydrocarbon), which is an unburned fuel, is increased in the exhaust gas exhausted from the cylinder and the HC is oxidized by the oxidation catalyst, by which the temperature of the exhaust gas on the downstream of the oxidation catalyst can be raised.

At this exhaust temperature rise, if the exhaust gas temperature is low such as in a case of a low-load/low-speed operation state, the exhaust gas temperature flowing into the oxidation catalyst is raised to a catalyst activation temperature or above of an oxidation catalyst by conducting the multiple injection in the first place. Then, after the temperature of the oxidation catalyst has been raised to the catalyst activation temperature or above, the post injection is conducted while the exhaust gas temperature is maintained equal to the catalyst activation temperature or above, and HC is supplied to the oxidation catalyst. This HC is oxidized by the oxidation catalyst and generates heat, and the exhaust gas flows into a filter in a state where the temperature is further raised. By this high-temperature exhaust gas, the PM accumulated in the filter is burned and removed.

As examples of the exhaust gas purification system for conducting this exhaust gas temperature rise control, an exhaust gas purification device as described in Japanese Patent Application Kokai Publication No. 2003-155915, Japanese Patent Application Kokai Publication No. 2003-155916, and Japanese Patent Application Kokai Publication No. 2003-155917 are proposed. This device is provided with a fuel adding means for post injection or the like in in-cylinder injection for adding an unburned fuel to an upstream side of an oxidation catalyst and a temperature raising means such as intake throttle and after-injection in the in-cylinder injection for raising a catalyst bed temperature to a temperature at which the fuel added by the fuel adding means can be oxidized when the temperature of the fuel does not fall within a predetermined temperature range.

However, if the exhaust gas temperature exhausted from the internal combustion engine and flowing into the oxidation catalyst is low, the oxidation catalyst is not activated. Thus, even if the unburned fuel is supplied, the unburned fuel is not oxidized by the oxidation catalyst. And the unburned fuel flows out as white smoke into the atmosphere without contributing to the temperature rise of a filter (DPF).

Therefore, in these exhaust gas purification devices, in an operation region where an exhaust gas temperature detected by a temperature sensor on the downstream side of the filter is low, that is, in the operation region where the exhaust temperature is extremely low and thus oxidation reaction of the fuel on the oxidation catalyst is difficult, the exhaust temperature is raised by the temperature raising means such as the intake throttle, after-injection. It is also configured that if the exhaust gas temperature or the like is higher than a predetermined determining temperature, an unburned fuel is supplied, while if the temperature is equal to the predetermined determining temperature or less, supply of the unburned fuel is prohibited.

In the conventional technology, a certain temperature such as a catalyst activation temperature (light-off temperature) of the oxidation catalyst is, in the device in Japanese Patent Application Kokai Publication No. 2003-155917, for example, fixed to approximately 200° C. with respect to the exhaust temperature.

However, it is found that even if the temperature of the oxidation catalyst or the like exceeds the predetermined determining value, the unburned fuel supplied into the exhaust gas is not oxidized by the oxidation catalyst depending on an operation state of an engine, and white smoke might be generated.

With regard to that, the inventors have obtained a finding through an experiment or the like that whether the oxidation catalyst can oxidize the unburned fuel or not depends not only on the temperature of the oxidation catalyst but relates to a flow velocity of an exhaust gas passing through the oxidation catalyst and has a great correlation with an engine speed relating to the flow velocity of the exhaust gas.

That is, when the engine speed is changed, flow rate and flow velocity of the exhaust gas are changed, and time during which the exhaust gas is in contact with the oxidation catalyst is also changed. Thus, even if the temperature of the oxidation catalyst remains the same, there are a case where the unburned fuel can be fully oxidized by the oxidation catalyst and a case where it can not be fully oxidized. Moreover, the oxidation temperature when the unburned fuel can be fully oxidized by the oxidation catalyst also relates to a model of the engine, a diameter, length, heat capacity, or the like of a device carrying the oxidation catalyst. However, when these parameters are fixed, the oxidation temperature has a correlation with the engine speed of the exhaust gas purification system and is found to be raised with increase of the engine speed.

That is, if the engine speed is increased, the exhaust gas flow rate is increased, the flow velocity of the exhaust gas passing through the oxidation catalyst becomes higher, and a contact time with the oxidation catalyst is reduced. Therefore, if the engine speed is increased, the temperature of the oxidation catalyst required to fully oxidize the unburned fuel becomes higher.

Patent Document 1: Japanese Patent Application Kokai Publication No. 2003-155915

Patent Document 2: Japanese Patent Application Kokai Publication No. 2003-155916

Patent Document 3: Japanese Patent Application Kokai Publication No. 2003-155917

SUMMARY OF THE INVENTION

The present invention was made in order to solve the above problem of white smoke generation through the above finding and has an object to provide an exhaust gas purification method and an exhaust gas purification system, in a forced regeneration control of oxidizing an unburned fuel supplied to an exhaust gas by an oxidation catalyst to thereby raise a temperature of a DPF at the forced regeneration of the DPF, in which the unburned fuel supplied into the exhaust gas can be surely oxidized and generation of white smoke, which is an outflow of the unburned fuel, can be prevented regardless of an operation state of an internal combustion engine.

The exhaust gas purification method for achieving the above object is, in an exhaust gas purification system comprising an exhaust gas purification device having an oxidation catalyst device carrying an oxidation catalyst and a diesel particulate filter arranged in order from an upstream side or an exhaust gas purification device having a diesel particulate filter carrying an oxidation catalyst arranged in an exhaust passage of an internal combustion engine, in which at forced regeneration of the diesel particulate filter, when a catalyst temperature index temperature indicating a temperature of the oxidation catalyst becomes equal to a predetermined determining temperature or above, control of raising a temperature of the diesel particulate filter is conducted by supplying an unburned fuel to the upstream side of the oxidation catalyst to thereby oxidize the unburned fuel by the oxidation catalyst, characterized in that the predetermined determining temperature is changed according to an engine speed of the internal combustion engine.

In addition, the exhaust gas purification system for achieving the above object is comprising an exhaust gas purification device having an oxidation catalyst device carrying an oxidation catalyst and a diesel particulate filter arranged in order from an upstream side or an exhaust gas purification device having a diesel particulate filter carrying an oxidation catalyst and a regeneration control device for conducting control of forced regeneration of the diesel particulate filter arranged in an exhaust passage of an internal combustion engine, in which at forced regeneration of the diesel particulate filter, when a catalyst temperature index temperature indicating a temperature of the oxidation catalyst becomes equal to a predetermined determining temperature or above, the regeneration control device conducts control of raising a temperature of the diesel particulate filter by supplying an unburned fuel to the upstream side of the oxidation catalyst to thereby oxidize the unburned fuel by the oxidation catalyst, characterized in that the regeneration control device is configured to change the predetermined determining temperature according to the engine speed of the internal combustion engine.

A temperature of the oxidation catalyst (bed temperature) is preferably used as a temperature for determination, however, since direct measurement of the temperature of the oxidation catalyst is difficult, the catalyst temperature index temperature indicating the temperature of the oxidation catalyst is used instead of it.

As the catalyst temperature index temperature, a temperature of an exhaust gas flowing into the oxidation catalyst, a temperature of the exhaust gas flowing out of the oxidation catalyst or a temperature derived from these both temperatures (average temperature or the like, for example) can be used. Moreover, using the both temperatures, respectively, a determination expression of the both temperatures can be used for logic of AND or OR. If the temperature of the oxidation catalyst can be measured, the temperature of the oxidation catalyst can be also included in the catalyst temperature index temperature herein.

That is, in the above exhaust gas purification system, the temperature detected by the temperature sensor arranged on the upstream side or downstream side of the oxidation catalyst for detecting a temperature of the exhaust gas is used as the catalyst temperature index temperature.

Alternatively, in the above exhaust gas purification system, if the exhaust gas purification device is the one having the oxidation catalyst device carrying the oxidation catalyst and the diesel particulate filter arranged in order from the upstream side, a temperature detected by a first temperature sensor detecting a temperature of the exhaust gas arranged on the upstream side of the oxidation catalyst and a temperature detected by a second temperature sensor detecting a temperature of the exhaust gas between the oxidation catalyst device and the diesel particulate filter are used as the catalyst temperature index temperature.

A relation of a predetermined determining temperature and engine speed with respect to these catalyst temperature index temperatures is different depending on a type of the engine, a diameter, length, or heat capacity of the device carrying the oxidation catalyst, arrangement of the exhaust gas purification system, a vehicle, or the like and it is not necessarily linear. However, there is a tendency that if the engine speed is increased, the predetermined determining temperature becomes higher. The relation between the predetermined determining temperature and the engine speed is acquired in advance by an experiment or the like and stored in the regeneration control device in the form of map data and functions.

According to the exhaust gas purification method and the exhaust gas purification system according to the present invention, at forced regeneration of the DPF, since a predetermined determining temperature relating to the catalyst temperature index temperature with respect to the oxidation catalyst when it is determined if the unburned fuel is to be supplied into the exhaust gas or not is changed according to the engine speed, the unburned fuel supplied into the exhaust gas can be surely oxidized, the temperature of the DPF can be efficiently raised, and generation of white smoke can be prevented.

DETAILED DESCRIPTION OF THE INVENTION

A control method of an exhaust gas purification system and the exhaust gas purification system according to embodiments of the present invention will be described below referring to the attached drawings.

Figure 1:
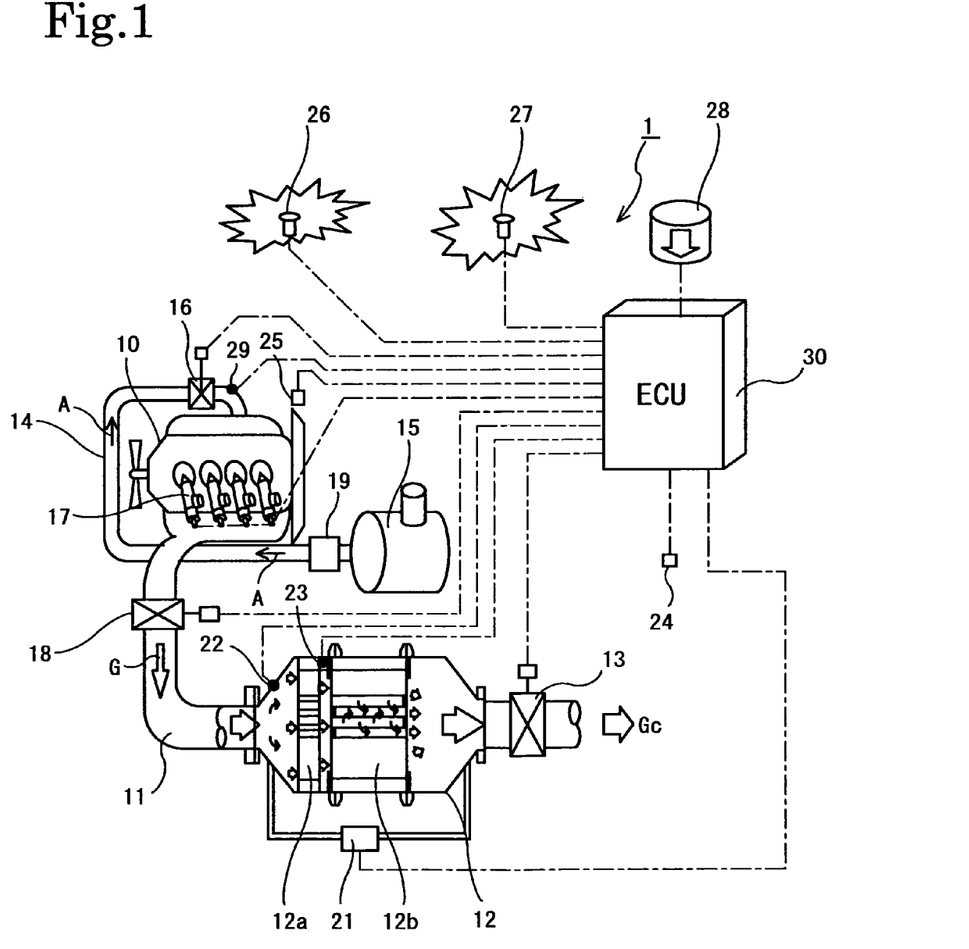
FIG. 1 is a diagram showing entire configuration of an exhaust gas purification system.

FIG. 1 shows configuration of an exhaust gas purification system 1 according to this embodiment. The exhaust gas purification system 1 includes an exhaust gas purification device 12 in an exhaust passage 11 of a diesel engine (internal combustion engine) 10.

The exhaust gas purification device 12 is one of continuous regeneration type DPF (diesel particulate filter) devices and includes an oxidation catalyst device 12a on an upstream side and a filter device 12b with catalyst on a downstream side.

The oxidation catalyst device 12a has an oxidation catalyst such as platinum (Pt) carried by a carrier such as a porous ceramic honeycomb structure. The filter device 12b with catalyst is formed by a filter such as a monolith-honeycomb wall-flow type filter in which an inlet and an outlet of a channel of a porous ceramic honeycomb are alternately sealed. PM (particulate matter) in an exhaust gas G is collected (trapped) by a wall of the porous ceramic. A catalyst such as platinum, cerium oxide is carried by this filter.

In order to estimate an accumulated amount of the PM in the filter device 12b with catalyst, a differential pressure sensor 21 is provided in a conduit pipe connected to the front and the back of the exhaust gas purification device 12. An exhaust brake valve (exhaust brake) 18 is provided on the upstream side of the exhaust gas purification device 12 and an exhaust throttle valve (exhaust throttle) 13 on the downstream side.

Moreover, for regeneration control of the filter device 12b with catalyst, an oxidation-catalyst inlet exhaust-temperature sensor (first temperature sensor) 22 is provided on the upstream side of the oxidation catalyst device 12a and a filter inlet exhaust-temperature sensor (second temperature sensor) 23 between the oxidation catalyst device 12a and the filter device 12b with catalyst, respectively.

This oxidation-catalyst inlet exhaust-temperature sensor 22 detects a first exhaust gas temperature Tg1, which is a temperature of the exhaust gas flowing into the oxidation catalyst device 12a. The filter inlet exhaust-temperature sensor 23 detects a second exhaust gas temperature Tg2, which is a temperature of the exhaust gas flowing into the filter device 12b with catalyst.

In an intake passage 14, an air cleaner 15, an MAF sensor (intake air amount sensor) 19, an intake throttle valve (intake throttle) 16, an intake temperature sensor 29 for detecting an intake temperature Ta, and the like are provided. The intake throttle valve 16 adjusts an amount of an intake A flowing into an intake manifold.

Output values from these sensors are inputted to a controller (ECU: Engine Control Unit) 30 for general control of operation of the engine 10 as well as regeneration control of the exhaust gas purification device 12. By a control signal outputted from the controller 30, the intake throttle valve 16, a fuel injection device (injection nozzle) 17, the exhaust throttle valve 13, the exhaust brake valve 18, an EGR valve provided at an EGR passage, not shown, with an EGR cooler for adjusting an EGR amount, and the like are controlled.

The fuel injection device 17 is connected to a common rail injection system (not shown) temporarily storing high-pressure fuel whose pressure has been raised by a fuel pump (not shown). Into the controller 30, information such as a vehicle speed, cooling water temperature in addition to information such as acceleration opening from an accelerator position sensor (APS) 24, engine speed from an engine speed sensor 25 are inputted for operation of the engine, and the controller 30 outputs an energization time signal so that a predetermined amount of fuel is injected from the fuel injection device 17.

In the forced regeneration control of the exhaust gas purification device 12, forced regeneration is conducted automatically during running. Not only that, but if a collected amount of PM in the filter device 12b with catalyst exceeds a certain amount and the filter device 12b with catalyst is clogged, an operator (driver) arbitrarily stops the vehicle and conducts forced regeneration. For the forced regeneration to be enabled, a flashing lamp (DPF lamp) 26 as a warning means for drawing attention of the driver on the clogging, an alarm lamp 27 lighted at abnormality, and a manual regeneration button (manual regeneration switch) 28 are provided.

In the control of the exhaust gas purification system 1, PM is collected in normal operation. In this normal operation, whether it is forced regeneration timing or not is monitored, and if it is determined as forced regeneration timing, an alarm is given or automatic regeneration during running is conducted.

The manual regeneration is used along with the automatic regeneration during running in which forced regeneration is conducted during running, and appropriately selected and conducted depending on values of a running distance and a DPF differential pressure. If a differential pressure ΔPm detected by the differential pressure sensor 21 arranged at the front and the back of the exhaust gas purification device 12 exceeds a predetermined value ΔP1, the flashing lamp 26, which is the warning means, is flashed to prompt the driver for regeneration of the DPF, and when the driver stops the vehicle and pushes the manual regeneration button 28, that is, when a regeneration-start instruction input is received, the forced regeneration control of the manual regeneration is started. The regeneration control device conducting these forced regeneration controls is incorporated in the controller 30.

Figure 2:
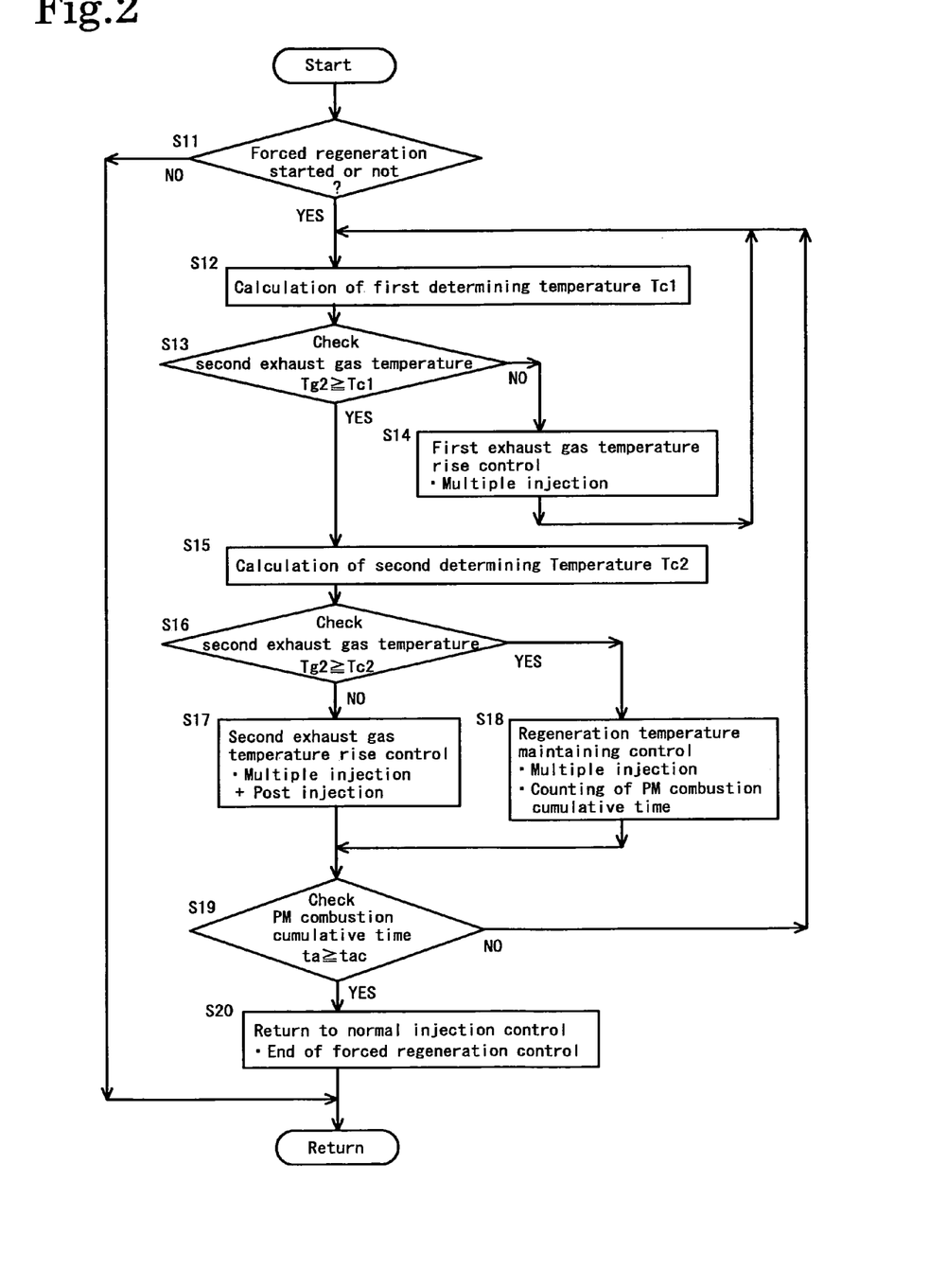
FIG. 2 is a flow chart showing a forced regeneration control of a first embodiment.

The forced regeneration such as the manual regeneration and automatic regeneration during running is conducted according to a control flow as exemplified in FIG. 2 in a first embodiment of the present invention. In the first embodiment, as the catalyst temperature index temperature indicating a temperature of the oxidation catalyst, a second exhaust gas temperature Tg2 detected by the filter-inlet exhaust temperature sensor 23 is used, and a first determining temperature Tc1 is used as the predetermined determining temperature. When the second exhaust gas temperature Tg2 becomes equal to the predetermined first determining temperature Tc1 or above, unburned fuel is supplied to the upstream side of the oxidation catalyst device 12a by the post injection.

When the control flow in FIG. 2 is started, it is determined if the forced regeneration has started or not at Step S11, and if the forced regeneration has not started, the forced regeneration is not conducted but the routine returns. If the forced regeneration is started at Step S11, the routine goes to Step S12.

Whether or not of the forced regeneration has started is determined as follows. If it is the automatic regeneration during running, for example, when it is detected from a detected value of the differential pressure sensor 21 or the like that the collected amount of PM in the filter device 12b with catalyst exceeds a certain amount, the forced regeneration is started. In the case of the manual regeneration, the forced regeneration is started when the driver, who is prompted for the manual regeneration, stops the vehicle and operates the manual regeneration button 28.

More specific determination can be made by using a forced regeneration start flag or the like and checking if this flag is 1 or 0 (zero) at Step S11 such that if this flag is 1, it is determined that forced regeneration has started, while if the flag is 0 (zero), it is determined that forced regeneration has not started.

At Step S12, the first determining temperature Tc1 is calculated. The first determining temperature Tc1 is a temperature that if the second exhaust gas temperature Tg2 becomes equal to the temperature or above, HC, which is the unburned fuel supplied by the post injection, is sufficiently oxidized by the oxidation catalyst of the oxidation catalyst device 12a and does not flow out to the downstream of the exhaust gas purification system 1 as white smoke.

Figure 4:
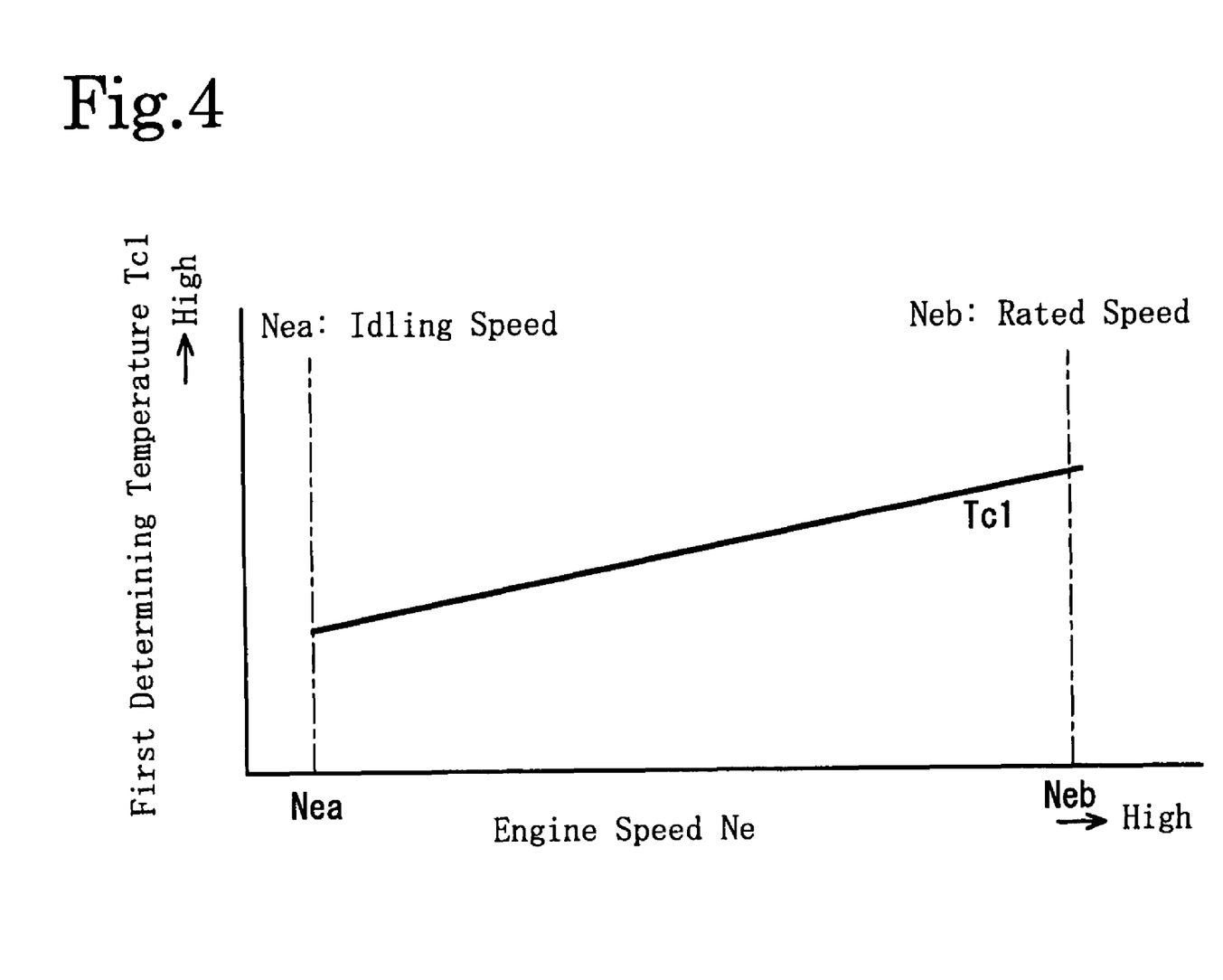
FIG. 4 is a graph showing a relation between a first determining value temperature and an engine speed.

In the conventional technology, the first determining temperature Tc1 is fixed to the catalyst activation temperature or the like (approximately 250° C., for example) regardless of an engine speed Ne. However, in the present invention, as shown in FIG. 4, the first determining temperature Tc1 is changed according to the engine speed Ne. That is, it is set to become higher with the increase of the engine speed Ne. In FIG. 4, the post injection is prohibited on the side lower than the first determining temperature Tc1, while the post injection is allowed on the upper side. In an example of the first determining temperature Tc1, the temperature is approximately 200° C. at an idling speed Nea and approximately 300° C. at a rated speed Neb, between which the temperature is acquired by linear interpolation.

A relation between the engine speed Ne and the first determining temperature Tc1 is different depending on the type of the engine, diameter, length, heat capacity, or the like of the oxidation catalyst 12a, arrangement of the exhaust gas purification system 1, or the like. However, if they are fixed, the relation between the engine speed Ne and the first determining temperature Tc1 can be grasped in advance by an experiment or the like. Thus, the relation is stored in the controller 30 as map data and functions and the first determining temperature Tc1 is calculated from the engine speed Ne by referring to the map data or the like.

At the subsequent Step S13, the second exhaust gas temperature Tg2 is checked. If the second exhaust gas temperature Tg2 is lower than the first determining temperature Tc1 calculated at Step S12, first exhaust gas temperature rise control for conducting the multiple injection is conducted at Step S14 for a predetermined time (time relating to an interval of check of the second exhaust gas temperature Tg2 at Step S13) $\Delta t1$. And the routine returns to Step S12.

If it is determined at Step S13 that the second exhaust gas temperature Tg2 is equal to the predetermined first determining temperature Tc1 or above, the routine goes to Step S15. At Step S15, the second determining temperature Tc2 is calculated.

The second determining temperature Tc2 is a target temperature for the second exhaust gas temperature rise control at Step S17. By maintaining the second exhaust gas temperature Tg2, which is a temperature of the exhaust gas detected by the filter inlet exhaust-temperature sensor 23 at this temperature or above, combustion of the PM collected in the filter device 12b with catalyst is maintained in a favorable state. The second determining temperature Tc2 is usually set at a value higher than a combustion start temperature of the PM (approximately 350° C., for example), at approximately 500° C., for example. It may be changed in many stages according to time.

At the subsequent Step S16, the second exhaust gas temperature Tg2 is checked. If the second exhaust gas temperature Tg2 is lower than the second determining temperature Tc2, the routine goes to the second exhaust gas temperature rise control at Step S17, while if the second exhaust gas temperature Tg2 is equal to the second determining temperature Tc2 or above, the routine goes to regeneration temperature maintaining control at Step S18.

At Step S17, the second exhaust gas temperature rise control for conducting the post injection in addition to the multiple injection is conducted for a predetermined time (time relating to an interval of check of the second exhaust gas temperature Tg2 at Step S16) $\Delta t2$. The exhaust gas temperature is raised by the multiple injection and at the same time, HC (unburned fuel) supplied into the exhaust gas by the post injection is oxidized by the oxidation catalyst and generates heat. By this heat generation, the exhaust gas flows into the filter device 12b with catalyst in the state that the second exhaust gas temperature Tg2 is raised higher than the first exhaust gas temperature Tg1. After the Step S17, the routine goes to Step S19.

If it is determined at Step S16 that the second exhaust gas temperature Tg2 is equal to the second determining temperature Tc2 or above, the regeneration temperature maintaining control for conducting the multiple injection in the in-cylinder injection of the engine 10 is conducted for a predetermined time (time relating to an interval of duration time check of the second exhaust gas temperature Tg2 at Step S16) $\Delta t3$ at Step S18.

At Step S18, PM combustion cumulative time is counted. In this count, only if the second exhaust gas temperature Tg2 is equal to the predetermined second determining temperature Tc2 or above, the PM combustion cumulative time ta is counted (ta=ta+$\Delta t3$). After the Step S18, the routine goes to Step S19.

At Step S19, in order to determine if the forced regeneration control is to be finished or not, the PM combustion cumulative time ta is checked. In this check, it is checked if the PM combustion cumulative time ta exceeds a predetermined determining time Tac or not. That is, if it is exceeded, the forced regeneration is determined to be completed, and the routine goes to Step S20, while if not exceeded, the forced regeneration is determined not to be completed, and the routine returns to Step S12. Till the PM combustion cumulative time ta exceeds the predetermined determining time tac, the first exhaust gas temperature rise control at Step S14, the second exhaust gas temperature rise control at Step S17, or the regeneration temperature maintaining control at Step S18 is conducted.

At Step S20, the forced regeneration control is finished, and the routine returns to the normal injection control. And then, it returns.

In the first and second exhaust gas temperature rise controls and regeneration temperature maintaining control, intake throttle by the intake throttle valve 16, the EGR valve, or the like and exhaust throttle by the exhaust throttle valve 13, the exhaust brake valve 18, or the like are used at the same time.

When the filter device 12b with catalyst is forcedly regenerated by the forced regeneration control according to the control flow in FIG. 2, such control can be conducted that the unburned fuel (HC) is supplied to the upstream side of the oxidation catalyst by the second exhaust temperature rise control and then the unburned fuel is oxidized by the oxidation catalyst to raise the temperature of the filter device 12b with catalyst, when the catalyst temperature index temperature Tg2 indicating the temperature of the oxidation catalyst becomes equal to the first determining temperature Tc1 or above, which is the predetermined determining temperature changed according to the engine speed Ne of the internal combustion engine 10 at the time. In the above, the second exhaust gas temperature Tg2 detected by the filter inlet exhaust-temperature sensor 23 is used as the catalyst temperature index temperature, but the first exhaust gas temperature Tg1 detected by the oxidation-catalyst inlet exhaust-temperature sensor 22 may be used.

Figure 3:
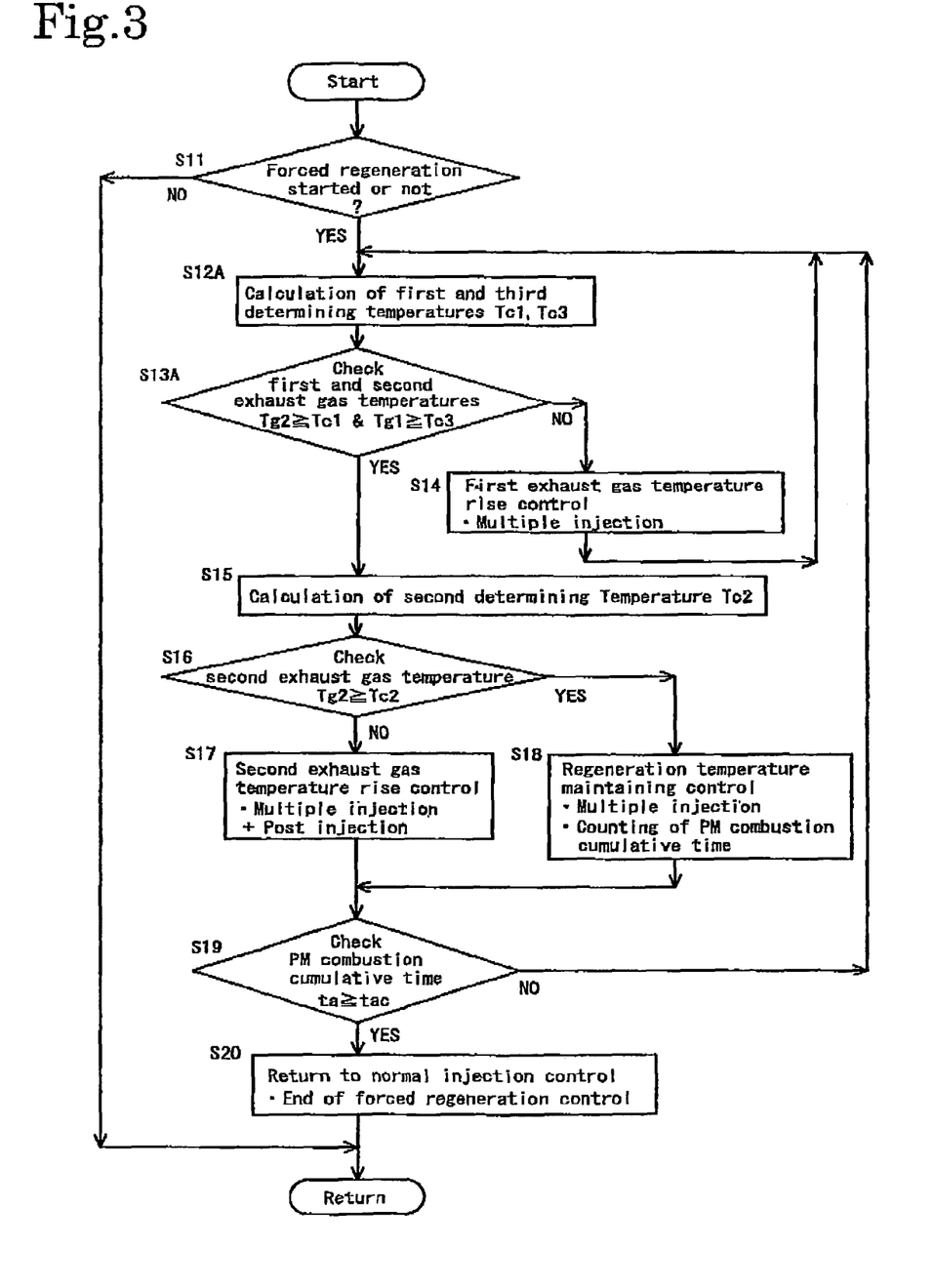
FIG. 3 is a flow chart showing a forced regeneration control of a second embodiment.

Next, a second embodiment will be described. In the second embodiment, the forced regeneration control is conducted according to a control flow as shown in FIG. 3. In the second embodiment, as the catalyst temperature index temperature indicating the temperature of the oxidation catalyst, the second exhaust gas temperature Tg2 detected by the filter inlet exhaust-temperature sensor 23 and the first exhaust gas temperature Tg1 detected by the oxidation-catalyst inlet exhaust-temperature sensor 22 are both used. As the predetermined determining temperatures for the both, respectively, the first determining temperature Tc1 and a third determining temperature Tc3 are used.

And if the second exhaust gas temperature Tg2 exceeds the first determining temperature Tc1 and the first exhaust gas temperature Tg1 exceeds the third determining temperature Tc3, the unburned fuel is supplied by the post injection to the upstream side of the oxidation catalyst device 12a.

The second embodiment in FIG. 3 is different from the first embodiment only in the point that Step S12 and Step S13 are replaced by Step S12A and step S13A. At Step S12A, the third determining temperature Tc3 is calculated in addition to the first determining temperature Tc1. At Step S13A, it is determined if the second exhaust gas temperature Tg2 is equal to the first determining temperature Tc1 or above and if the first exhaust gas temperature Tg1 is equal to the third determining temperature Tc3 or above.

Only if the second exhaust gas temperature Tg2 is equal to the first determining temperature Tc1 or above and the first exhaust gas temperature Tg1 is equal to the third determining temperature Tc3 or above, the routine goes to Step S15, while in the other cases, the routine goes to Step S14.

In the second embodiment, the first determining temperature Tc1 and the third determining temperature Tc3 calculated at the Step S12A are changed according to the engine speed Ne, respectively. That is, they are set so as to become higher with the increase of the engine speed Ne.

A relation between the engine speed Ne and the first determining temperature Tc1 or the third determining temperature Tc3 is different depending on the type of the engine, a diameter, length, heat capacity, or the like of the oxidation catalyst 12a, arrangement of the exhaust gas purification system 1, or the like. However, if these parameters are fixed, the relation between the engine speed Ne and the first determining temperature Tc1 or the third determining temperature Tc3 can be grasped in advance by an experiment or the like. Thus, the relation is stored in the controller 30 as map data or functions and the first determining temperature Tc1 and the third determining temperature Tc3 are calculated from the engine speed Ne by referring to the map data or the like.

When the filter device 12b with catalyst is to be forcedly regenerated by the forced regeneration control according to the control flow in FIG. 3, when the catalyst temperature index temperature Tg2 indicating the temperature of the oxidation catalyst is equal to the first determining temperature Tc1 or above, which is the predetermined determining temperature changed according to the engine speed Ne of the internal combustion engine 10 at that time and the catalyst temperature index temperature Tg1 similarly indicating the temperature of the oxidation catalyst is equal to the third determining temperature Tc3 or above, which is the predetermined determining temperature changed according to the engine speed Ne of the internal combustion engine 10 at that time, the control to raise the temperature of the filter device 12b with catalyst can be conducted by supplying the unburned fuel (HC) to the upstream side of the oxidation catalyst by the second exhaust temperature rise control to thereby oxidize the unburned fuel by the oxidation catalyst.

According to the above exhaust gas purification method and the exhaust gas purification system 1, the predetermined determining temperatures Tc1, Tc3 relating to the oxidation catalyst index temperatures Tg2, Tg1 at determination on whether the unburned fuel is to be supplied into the exhaust gas or not during the forced regeneration of the filter (DPF) 12b with catalyst are changed according to the engine speed Ne. Thus, the unburned fuel supplied into the exhaust gas can be surely oxidized, the temperature of the filter 12b with catalyst can be efficiently raised, and generation of white smoke can also be prevented. In the above, the determining temperatures Tc1, Tc3 are changed, respectively, according to the engine speed Ne for both of the catalyst temperature index temperatures Tg2, Tg1, but either one of them may be changed.

In the above embodiment, a combination of the oxidation catalyst device on the upstream side and the filter (DPF) with catalyst on the downstream side was described as an example of the exhaust gas purification device of the exhaust gas purification system, but it may be a filter (DPF) carrying the oxidation catalyst. Moreover, the post injection was described as a method of supplying the unburned fuel to the upstream side of the oxidation catalyst, but a method of direct injection in an exhaust pipe, wherein an unburned fuel supply device is arranged in the exhaust passage 14 and the unburned fuel is directly injected into the exhaust passage 14 from the unburned fuel supply device, may be employed.

Though not described in the above control flows in FIG. 2 and FIG. 3 in order to avoid complexity, the second exhaust gas temperature Tg2 is usually monitored all the time in order to prevent abnormal combustion of the PM in the filter 12b with catalyst, and if the second exhaust gas temperature Tg2 exceeds a predetermined determining value (fourth determining temperature Tc4) higher than the second determining value Tc2 at Step S18, the post injection or the like may be stopped and only the multiple injection may be conducted.

INDUSTRIAL APPLICABILITY

The exhaust gas purification method and the exhaust gas purification system of the present invention having the above-mentioned excellent advantages can be used extremely effectively in an exhaust gas purification system provided in an internal combustion engine or the like mounted on an automobile and provided with an exhaust gas purification device having an oxidation catalyst device carrying an oxidation catalyst and a DPF arranged in order from an upstream side or a DPF carrying an oxidation catalyst in an exhaust passage of the internal combustion engine.

What is claimed is:

1. An exhaust gas purification method in an exhaust gas purification system, comprising:
   providing an exhaust gas purification device, having an oxidation catalyst device with an oxidation catalyst and a diesel particulate filter, in an exhaust passage of an internal combustion engine;
   obtaining a predetermined determining temperature based on an engine speed of the internal combustion engine, which predetermined determining temperature is a temperature necessary to oxidize an unburned fuel supplied to the oxidation catalyst device;
   comparing a catalyst temperature index temperature, indicating a temperature of the oxidation catalyst, with the predetermined determining temperature;
   when the catalyst temperature index temperature becomes equal to the predetermined determining temperature or above, raising a temperature of the diesel particulate filter by supplying the unburned fuel to the oxidation catalyst to have the unburned fuel oxidized by the oxidation catalyst, and
   when the catalyst temperature index temperature is lower than the predetermined determining temperature, raising an exhaust gas temperature,
   wherein the predetermined determining temperature is obtained based on the engine speed of the internal combustion engine after the exhaust gas temperature is raised; and
   comparing the obtained predetermined determining temperature with the catalyst temperature index temperature.

2. The exhaust gas purification method according to claim 1, detecting a temperature on an upstream side or a downstream side of the oxidation catalyst for detecting the temperature of the exhaust gas, and using the detected temperature as the catalyst temperature index temperature.

3. The exhaust gas purification method according to claim 1, further comprising:
   arranging the oxidation catalyst and the diesel particulate filter in order from an upstream side;
   selecting, as the catalyst temperature index temperature, a temperature detected by a first temperature sensor arranged on the upstream side of the oxidation catalyst for detecting the temperature of the exhaust gas, and
   selecting a temperature detected by a second temperature sensor arranged between the oxidation catalyst device and the diesel particulate filter for detecting the temperature of the exhaust gas.

4. An exhaust gas purification system, comprising:
   an exhaust gas purification device, having an oxidation catalyst device with an oxidation catalyst and a diesel particulate filter, arranged in an exhaust passage of an internal combustion engine;
   a regeneration control device for controlling forced regeneration of the diesel particulate filter, in which a predetermined determining temperature based on an engine speed of the internal combustion engine is obtained, which predetermined determining temperature is a temperature necessary to oxidize an unburned fuel supplied in the oxidation catalyst device; and
   a catalyst temperature index temperature, indicating a temperature of the oxidation catalyst, which is compared with the predetermined determining temperature;
   when the catalyst temperature index temperature becomes equal to the predetermined determining temperature or above, the temperature of the diesel particulate filter is raised by supplying the unburned fuel to the oxidation catalyst to have the unburned fuel oxidized by the oxidation catalyst; and
   when the catalyst temperature index temperature is lower than the predetermined determining temperature, the exhaust gas temperature is raised by the regeneration control device,
   wherein the predetermined determining temperature is obtained based on the engine speed of the internal combustion engine after the exhaust gas temperature is raised, and
   wherein the obtained predetermined determining temperature is compared with the catalyst temperature index temperature by the regeneration control device.

5. The exhaust gas purification system according to claim 4, wherein a temperature detected by a temperature sensor arranged on an upstream side or a downstream side of the oxidation catalyst for detecting the temperature of the exhaust gas is used as the catalyst temperature index temperature.

6. The exhaust gas purification system according to claim 4, wherein the oxidation catalyst and a diesel particulate filter are arranged in order from an upstream side of the oxidation catalyst, and
   wherein, as the catalyst temperature index temperature, a temperature detected by a first temperature sensor arranged on the upstream side of the oxidation catalyst for detecting the temperature of the exhaust gas, and a temperature detected by a second temperature sensor arranged between the oxidation catalyst device and the diesel particulate filter for detecting the temperature of the exhaust gas, are used.

* * * * *